(12) United States Patent
Muehlfeld et al.

(10) Patent No.: US 12,310,274 B1
(45) Date of Patent: May 27, 2025

(54) PRECISION AGRICULTURE USING POSE GEOREFERENCED ANALYTICS

(71) Applicant: Sentera, Inc., St. Paul, MN (US)

(72) Inventors: Andrew Muehlfeld, St. Paul, MN (US); Henry Nelson, St. Paul, MN (US); Ryan Nelson, St. Paul, MN (US); Eric Taipale, St. Paul, MN (US); Nicholas Witthoeft, St. Paul, MN (US)

(73) Assignee: SENTERA, INC., St. Paul, MN (US)

( * ) Notice: Subject to any disclaimer, the term of this patent is extended or adjusted under 35 U.S.C. 154(b) by 346 days.

(21) Appl. No.: 17/715,440

(22) Filed: Apr. 7, 2022

(51) Int. Cl.
| | | |
|---|---|---|
| *A01B 79/00* | (2006.01) | |
| *A01B 79/02* | (2006.01) | |
| *B64U 10/13* | (2023.01) | |
| *G06T 3/02* | (2024.01) | |
| *G06T 3/4038* | (2024.01) | |
| *G06V 10/75* | (2022.01) | |
| *G06V 20/10* | (2022.01) | |
| *G06V 20/17* | (2022.01) | |
| *B64U 101/30* | (2023.01) | |

(52) U.S. Cl.
CPC .......... *A01B 79/005* (2013.01); *A01B 79/02* (2013.01); *B64U 10/13* (2023.01); *G06T 3/02* (2024.01); *G06T 3/4038* (2013.01); *G06V 10/751* (2022.01); *G06V 20/17* (2022.01); *G06V 20/188* (2022.01); *B64U 2101/30* (2023.01); *B64U 2201/10* (2023.01)

(58) Field of Classification Search
CPC ...... A01B 79/005; A01B 79/02; G06V 20/17; G06V 10/751; G06V 20/188; G06T 3/02; G06T 3/4038; B64C 39/024; B64U 2201/10; B64U 2101/30
See application file for complete search history.

(56) References Cited

U.S. PATENT DOCUMENTS

| | | | |
|---|---|---|---|
| 5,987,164 A * | 11/1999 | Szeliski | G06V 10/147 382/284 |
| 6,711,293 B1 * | 3/2004 | Lowe | G06V 10/462 382/220 |
| 10,402,942 B2 | 9/2019 | Taipale et al. | |
| 11,036,983 B1 * | 6/2021 | Nelson | G06T 7/33 |
| 2002/0122564 A1 * | 9/2002 | Rhoads | G06F 16/29 382/100 |
| 2005/0149235 A1 * | 7/2005 | Seal | A01B 79/005 382/110 |
| 2006/0066730 A1 * | 3/2006 | Evans, Jr. | H04N 23/58 348/218.1 |

(Continued)

OTHER PUBLICATIONS

Chen et al., Modeling and Calibration for 3D Robot, IEEE, 1987 (Year: 1987).*

*Primary Examiner* — Kyle R Quigley
(74) *Attorney, Agent, or Firm* — Merchant & Gould P.C.

(57) ABSTRACT

Precision agriculture methods and systems where drone images of an agricultural field are captured by a UAV and analyzed to generate information regarding the agricultural field. Items of interest are identified in the images, the pixel-space locations of the items of interest are determined, and the world-space locations of the items of interest are then determined using the pixel-space locations. The transformation from pixel-space location to world-space location occurs without transforming the images or processing transformed images.

24 Claims, 5 Drawing Sheets

(56) References Cited

U.S. PATENT DOCUMENTS

| | | | |
|---|---|---|---|
| 2010/0283853 A1* | 11/2010 | Acree | G01C 11/00 |
| | | | 382/293 |
| 2011/0147479 A1* | 6/2011 | Overskeid | A01M 21/043 |
| | | | 239/71 |
| 2016/0071239 A1* | 3/2016 | Giuffrida | G06T 11/60 |
| | | | 382/284 |
| 2018/0075545 A1* | 3/2018 | Richt | G06V 20/188 |
| 2018/0112978 A1* | 4/2018 | Burton | G01C 11/025 |
| 2018/0114293 A1* | 4/2018 | Isler | G06V 20/188 |
| 2019/0073792 A1* | 3/2019 | Fletcher | G01C 11/00 |
| 2019/0096033 A1* | 3/2019 | Taipale | G06V 20/64 |
| 2019/0180476 A1* | 6/2019 | Matsuzawa | H04N 25/61 |
| 2019/0364206 A1* | 11/2019 | Dal Mutto | H04N 23/698 |
| 2020/0007836 A1* | 1/2020 | Matsuzawa | H04N 9/3185 |
| 2021/0243940 A1* | 8/2021 | Snyder | A01M 21/02 |
| 2022/0038644 A1* | 2/2022 | McAllister | G01J 5/02 |
| 2022/0124960 A1* | 4/2022 | Canyon | A01B 69/001 |
| 2024/0020875 A1* | 1/2024 | den Hartog | G06F 18/24133 |

* cited by examiner

PRECISION AGRICULTURE USING POSE GEOREFERENCED ANALYTICS

FIELD

This technical disclosure relates to aerial imaging of agricultural fields using unmanned aerial vehicles (UAVs) for use in precision agriculture.

BACKGROUND

In precision agriculture, aerial images of an agricultural field are often captured by one or more imaging systems mounted on an aerial vehicle such as an unmanned aerial vehicle (UAV). It is desirable in imaging using a UAV to maximize detail while minimizing time to collect imagery and minimizing the data volume of imagery. Where precise locations of items of interest are important, current practice is to stitch images together. Stitching requires high overlap between the images which increases time to collect imagery, increases data volume, and reduces image detail. U.S. Pat. No. 10,402,942 describes an example of stitching aerial images obtained by an imaging system on a UAV. Another option is to use two imaging systems on the UAV, one optimized for detail and one optimized for stitching, and generating an image based on both sets of images from the two imaging systems. U.S. Pat. No. 11,036,983 describes a UAV with two imaging systems.

SUMMARY

Precision agriculture methods and systems are described where images (referred to as drone images) of an agricultural field are captured by a UAV and analyzed to generate information regarding the agricultural field. As described in further detail herein, items of interest are identified in the images, the pixel-space locations of the items of interest are determined, and the world-space locations of the items of interest are then determined using the pixel-space locations. The transformation from pixel-space location to world-space location occurs without transforming the images or processing transformed images.

In one embodiment, a precision agriculture method described herein can include receiving a plurality of drone images of an agricultural field that are captured by a UAV. Each one of the drone images is then analyzed using at least one computer processor, wherein the analysis includes for each one of the drone images: determining a pixel-space location of at least one item of interest in the drone image; applying a transform to the pixel-space location to determine the world-space location of the at least one item of interest in the drone image; and saving the world-space locations for all of the items interest from all of the drone images in data storage.

In another embodiment described herein, a precision agriculture method includes receiving a plurality of drone images of an agricultural field that are captured by a UAV. Each one of the drone images is analyzed using at least one computer processor, wherein the analysis includes for each one of the drone images: determining a pixel-space location of at least one item of interest in the drone image; and applying a transform to the pixel-space location to determine the world-space location of the at least one item of interest in the drone image. Thereafter, information regarding the agricultural field can be generated using the world-space locations. For example, a spot spray weed prescription for the agricultural field can be generated using the world-space locations, or a count of items of interest within a plot of the agricultural field can be produced.

In another embodiment described herein, a precision agriculture system can include a UAV with an imaging system that captures a plurality of drone images of an agricultural field. The system further includes at least one computer processor, and a storage device that includes instructions, which when executed by the at least one computer processor, configure the at least one computer processor to: analyze each one of the drone images, including for each one of the drone images: determine a pixel-space location of at least one item of interest in the drone image; apply a transform to the pixel-space location to determine the world-space location of the at least one item of interest in the drone image; and save the world-space locations for all of the items interest from all of the drone images in data storage.

DETAILED DESCRIPTION

Figure 1:
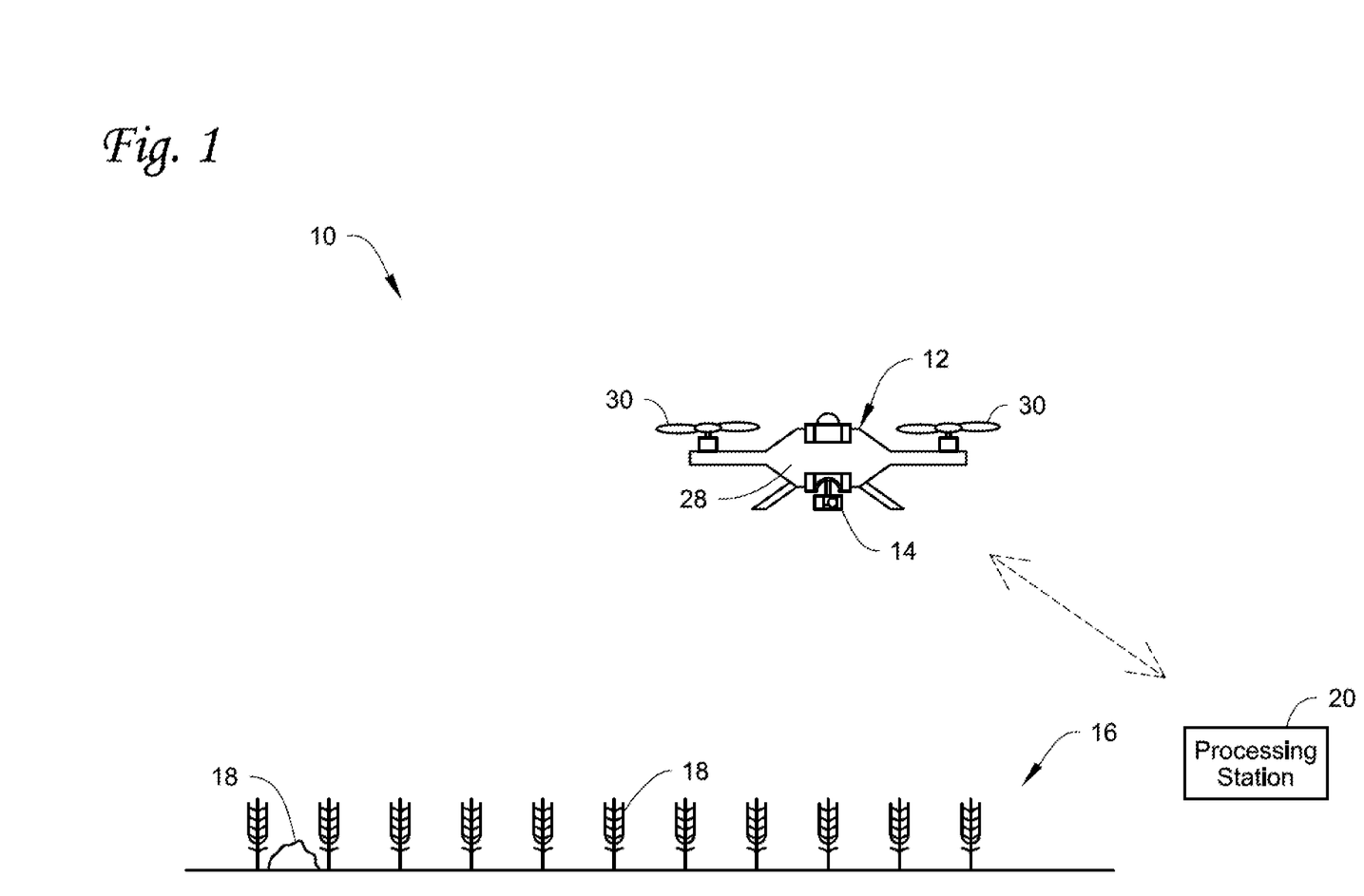
FIG. 1 illustrates a UAV in flight over an agricultural field to capture drone images of the field.

Referring initially to FIG. 1, part of a system 10 described herein is illustrated. The system 10 includes an aerial vehicle 12, in this example depicted as a UAV. In one non-limiting embodiment, the UAV can be a quad-copter or quad-rotor UAV. However, the UAV may alternatively include other types of UAVs including, but not limited to, other type of rotorcraft UAV, a fixed-wing UAV, or another type of UAV. The UAV 12 includes an imaging system 14 mounted thereon for capturing images of an agricultural field 16 as the UAV 12 is flown over the field 16. The field 16 also includes various items of interest 18.

A processing station 20, which may be considered part of the system 10 or separate from the system 10, is also provided. The processing station 20 is in direct or indirect communication with the UAV 12 to receive drone image data from the UAV 12. The processing station 20 can be a ground control station or similar to a ground control station, or the processing station 20 can be a non-ground control station. A ground control station is a device that is able to control the UAV 12 such as control the flight and/or the flight path of the UAV 12.

As described in further detail below, a plurality of drone images of the agricultural field 16 are captured by the UAV 12. Each one of the drone images is analyzed using at least one computer processor, for example on the UAV 12 or in the processing station 20. The analysis includes for each one of the drone images, determining a pixel-space location of at least one of the items of interest 18 in the drone image, applying a transform to the pixel-space location to determine the world-space location of the at least one item of interest 18, and saving the world-space locations for all of the items interest 18 from all of the drone images in data storage. In an embodiment, processing can be implemented to deal with cases where the same item of interest is in two or more of the drone images, and the world-space locations are close but not identical. For example, there may be slight errors in the processing and the pixel-space locations, and differences between the items of interest, such as differences in size and/or proximity, can be determined to determine if the two items are actually the same items or if they are different items. The world-space locations can then be used to generate information regarding the field 16.

The items of interest 18 can be any items in the field 16 that can be identified in the drone images captured by the UAV 12. The items of interest 18 can be identified in any suitable manner including, but not limited to, as a point, a point representing the center of the item, a bounding box containing the item, a list of cells that are fully or partially occupied by the item, or an outline of the item. Examples of the items of interest 18 include, but are not limited to, individual plants (crops or weeds); a tassel; a diseased plant or leaf, a rock; an anther; groups of items; water, such as in ponding; and other items found in agricultural fields. When the items are plants, examples of the plants can be, but are not limited to, weeds, corn, soybeans, potatoes, sugar beets, edible beans, wheat, barley, sunflowers, cucumbers, tomatoes, other vegetables, canola, trees, and the like. The items of interest that are identified in the drone images can be the same items of interest (for example, the same type of plant, the same type of weed, rocks, etc.), the items of interest may be different, or different types of items of interest may be identified in each drone image (for example, crops and weeds, plants and rocks, etc. may be identified in each drone image).

The items of interest 18 can be characterized based on any item attribute(s) that permits the items of interest 18 to be described after the items of interest have been identified. Examples of item attributes that can be used to characterize the items of interest include, but are not limited to, crop species, weed species, crop genus, weed genus, or other category of species; plant sub-species including regional variants; plant size; plant color; and the like.

Figure 2:
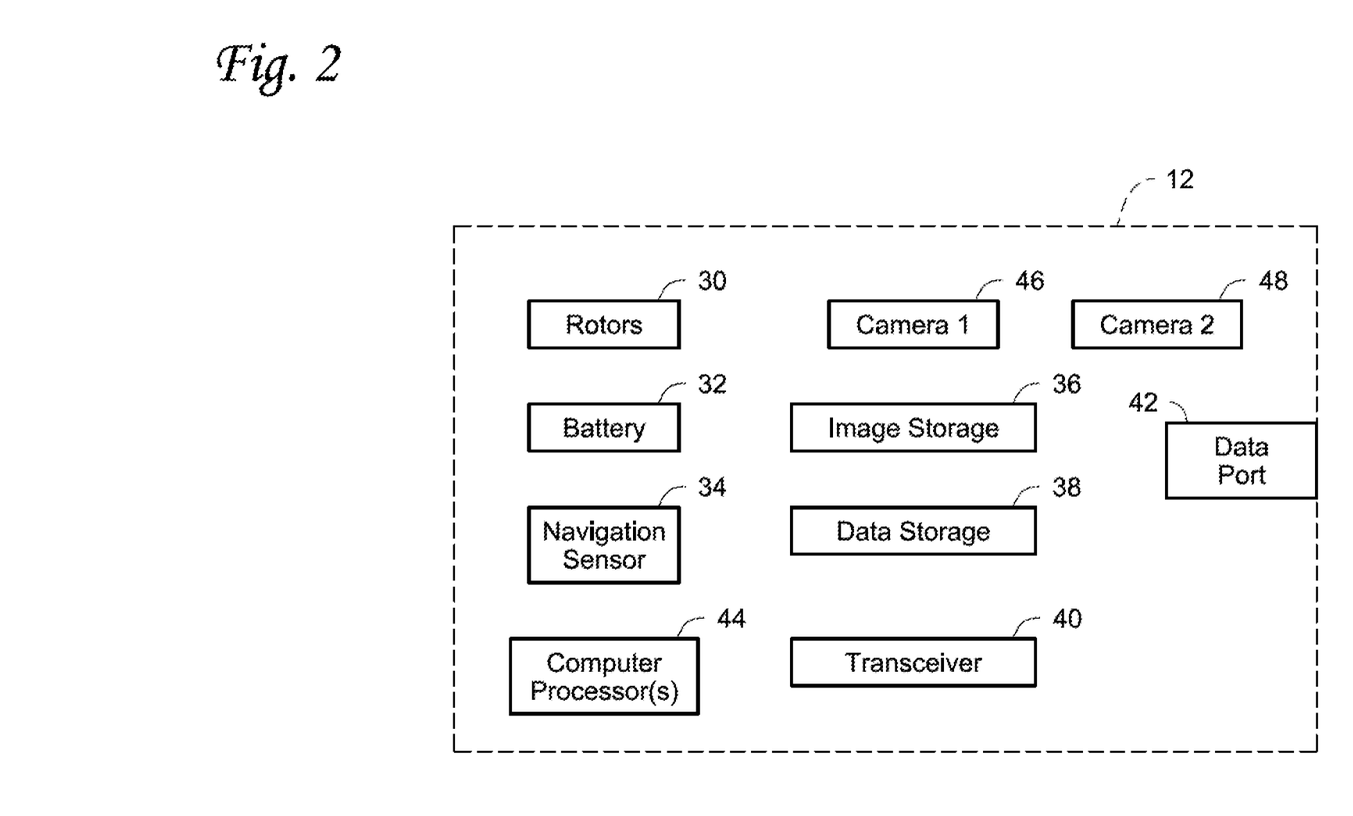
FIG. 2 is a schematic depiction of components of the UAV.

Referring to FIGS. 1 and 2, the UAV 12 can include a fuselage 28 to which the imaging system 14 is mounted, a plurality of, for example four, rotors 30, one or more batteries 32 (which may be rechargeable), and a navigation system 34. The UAV 12 may alternatively be a fixed-wing UAV with a single rotor. In addition, the UAV 12 may alternatively be gasoline powered, powered by one or more fuel cells, or powered by other power sources. The drone image data from the imaging system 14 can be stored in an image storage 36. Other data, for example location data from the navigation system 34, can be stored in another data storage 38 (or stored in the image storage 36). In some embodiments, the drone image data may be wirelessly transmitted from the UAV 12 to the processing station 20, to a separate ground control station (not illustrated), to a cloud computing environment, or to any other receiving entity using an optional transceiver 40. The processing station 20 may be near the field being imaged and may or may not directly communicate with the UAV 12, or the processing station 20 may be remote from the field being imaged and may or may not be in direct communication with the UAV 12. In addition, the UAV 12 can include a data port 42, for example a USB port, or a removable SD card for downloading/exporting drone image data from the UAV 12. The UAV 12 may also include one or more computer processors 44, for example one or more CPUs and/or GPUs and/or FPGAs, thereon for analyzing/processing the drone images in real time on the UAV 12. The computer processor(s) 44 may be incorporated on the UAV 12 itself, or be incorporated on the imaging system 14 which may be removably mounted on the UAV 12.

The rotors 30 rotate to provide the lift and propulsion for the UAV 12. The battery 32 provides stored electrical energy for powering the various electrical components of the UAV 12. The navigation system 34 may include one or more navigation sensors. Examples of navigation sensors include, but are not limited to, an inertial measurement unit (IMU), which may include an accelerometer and gyroscope to output UAV 12 roll, pitch, yaw, acceleration, or approximate velocity calculated based on acceleration; a compass to provide heading or a global navigation satellite system (GNSS), such as the Global Positioning System (GPS) to provide location; a GPS receiver; an RTK GPS receiver; a barometer; air speed sensor; laser altimeter; and a processor running a "navigation filter", which is an algorithm that combines all sensor data to estimate position and orientation. The transceiver 40 (if provided) can be any conventional transceiver known in the art for wirelessly transmitting and receiving data/commands.

The imaging system 14 may include a single camera 46 or, in another embodiment, include a second camera 48. If the two cameras 46, 48 are provided, one of the cameras, such as the camera 46, can have a first field of view, which may be considered to be a wide field of view, while the other camera, such as the camera 48, can have a second field of view, which may be considered to be a narrow field of view. The wide field of view camera generates a first plurality of drone images having a first (or wide) field of view that provides high coverage area but lower detail compared to the images of the narrow field of view camera. The narrow field of view camera generates a second plurality of drone images having a second (or narrow) field of view that is less than the first field of view, with lower area coverage but higher detail compared to the wide field of view camera. An example of an imaging system on a UAV with a wide field of view camera and a narrow field of view camera is described in U.S. Pat. No. 11,036,983 the entire contents of which are incorporated herein by reference.

The imaging system 14 can be any type of imaging system capable of capturing images of the field. The imaging system 14 may capture one or more of RGB (normal color) images; multispectral images; false color images; indexed images such as, but not limited to, NDVI or NDRE; black and white; grayscale; hyperspectral; and any combinations thereof. The imaging system 14 may also capture video images from which the drone images are obtained.

Figure 3:
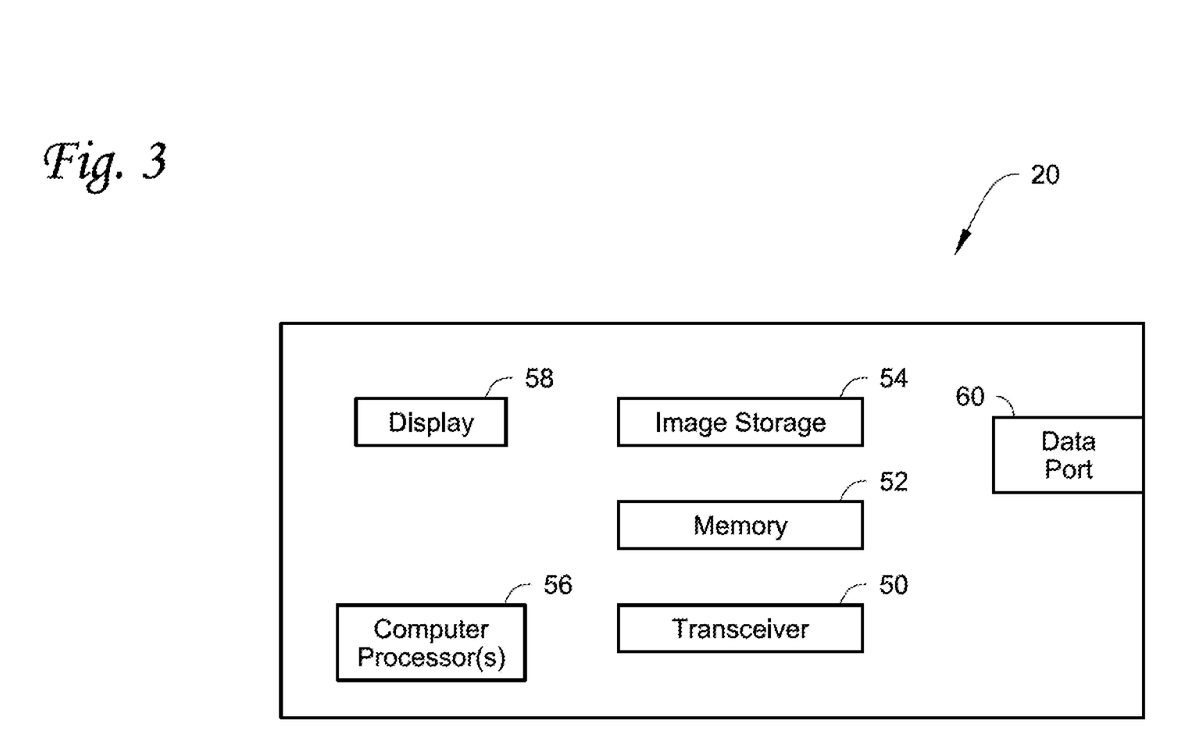
FIG. 3 is a schematic depiction of a system separate from the UAV for analyzing the drone images.

With reference to FIGS. 1 and 3, the processing station 20, which can be, for example, a ground control station which can be on-site or off-site; a non-ground control station which can be on-site or off-site; a cloud computing environment; and the like, can include a transceiver 50, memory 52 that stores data processing algorithms, an image storage 54 that can store the drone images, one or more computer processors 56 (for example one or more CPUs and/or GPUs and/or FPGAs), a display screen 58, and a data port 60. Other elements can also be included on the processing station 20 such as one or more user inputs which can be, for example, input buttons or inputs on a touchscreen which can be separate from, or incorporated into, the display screen 58. The transceiver 50 can be any conventional transceiver known in the art for wirelessly communicating with the UAV 12. The data port 60 can mechanically interface with a suitable mechanical connector for transferring data from or into the station 20.

Figure 4:
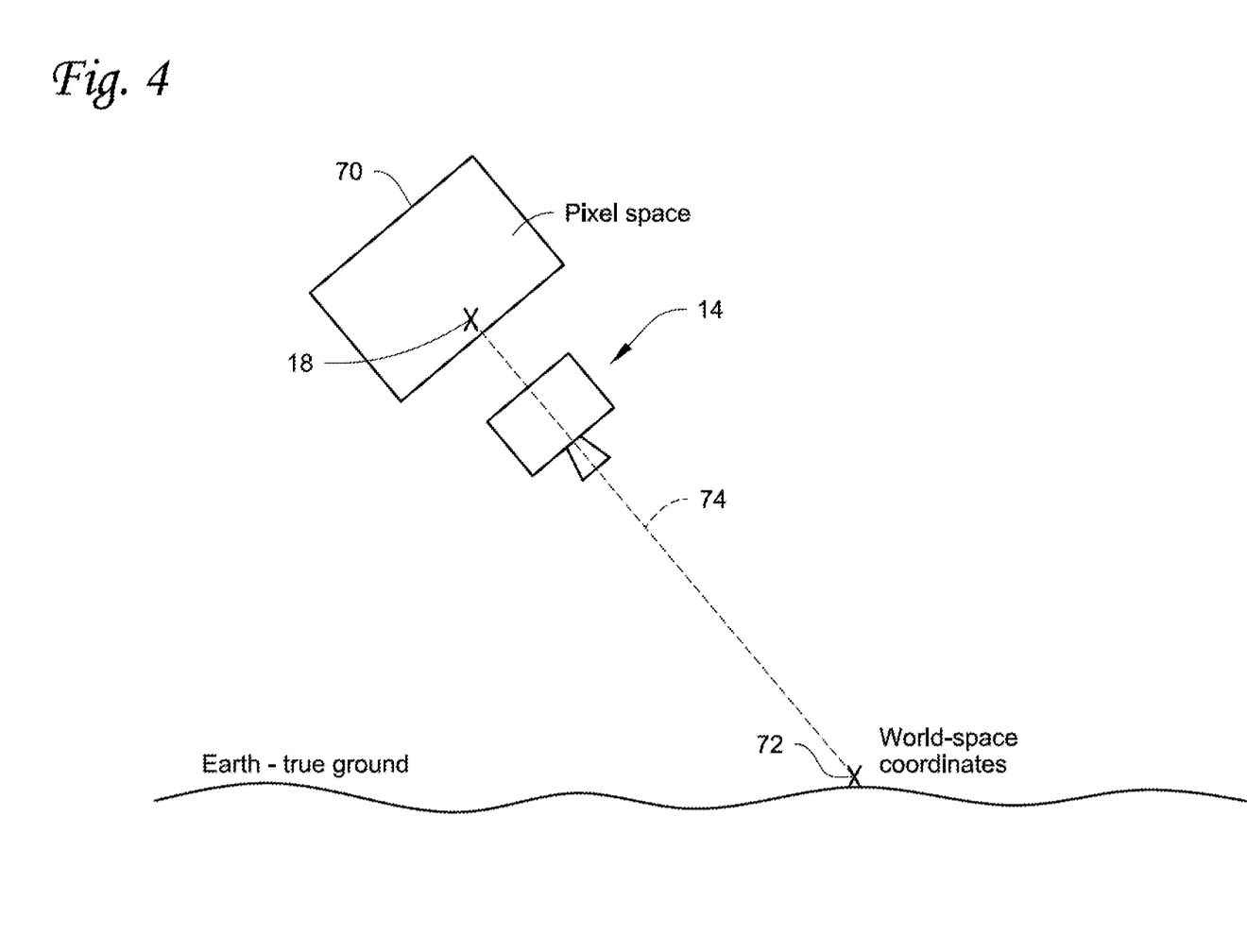
FIG. 4 schematically depicts the concept of transformation from pixel-space location to world-space location of the items of interest.

Referring to FIG. 4, one drone image 70 is schematically depicted. The drone image 70 has been obtained by the imaging system 14 on the UAV for example by the camera 46 (see FIG. 2) or the camera 48 (see FIG. 2) if both cameras are provided. One of the items of interest 18 has been identified. The item of interest 18 has a location in pixel space that can be represented by x, y, coordinates of the camera. However, to determine where that item of interest is located in the field (which can also be termed true ground location or world-space location), the pixel space location of the item of interest 18 must be converted to the corresponding actual world-space location 72 of the item of interest. As described in more detail below, this conversion to the actual world-space location is performed using a transform represented by the broken line 74 indicated in FIG. 4. The world-space location 72 can be a coordinate in any coordinate reference system indicating a location on Earth. Examples of coordinate reference systems include, but are not limited to, latitude/longitude in WGS84, or Easting and Northing in UTM15N. The coordinates of the world-space location 72 may optionally include altitude/elevation of the item of interest or the ground on which the item of interest is located, but altitude/elevation is not required.

The transform 74 used to transform from pixel space location to the corresponding world-space location 72 can be any set of parameters and equations enabling computation of the world-space location 72 from the pixel-space location. In some embodiments, the transform may include one or more internal parameters of the camera(s) of the imaging system that describe one or more physical/optical characteristics of the camera(s) like lens distortion (radial distortion and/or tangential distortion), principal point, focal length, shutter speed, electronic rolling shutter line readout time, electronic rolling shutter frame readout time, and the like. In some embodiments, the transform may include one or more parameters external to the camera(s) of the imaging system such as the camera location (x, y, z) and orientation (roll, pitch, yaw which are sometime transformed to omega, phi, kappa) collectively referred to as the camera's pose. The transform 74 can be a single transform or a series of transforms. One example of a transform is typically referred to as "a homography". Examples of methods that can be used to transform pixel space location to its corresponding world-space location include navigation system georeferencing (NSGR), auto-georeferencing (AGR), one-camera photogrammetry-calibrated pose generation (OC-PCPG) process, and two-camera photogrammetry-calibrated pose generation (TC-PCPG) process.

The word pose used herein refers to a set of internal parameters, a set of external parameters, or both. The imaging system's 14 internal parameters are a set of one or more numerical values describing the imaging characteristics of the imaging system 14. The internal parameters may be constant across the imaging (or mapping) task. Internal parameters may include, but are not limited to: the pixel-space location of the optical center of the imaging system, the physical dimensions of the imaging system, the pixel-space dimensions of the imaging system, the focal length of the imaging system's lens, and coefficients of a distortion model which describe tangential or radial distortion of the lens. The imaging system's external parameters are a set of one or more numerical values describing the imaging system relative to its surroundings. External parameters can include, but are not limited to, location, orientation, and velocity of the imaging system in a coordinate system, such as geospatial coordinates. The external parameters may vary with each image of the mapping area collected. Orientation can be a set of angles describing the direction the imaging system faces, such as roll, pitch, and yaw or omega, phi, and kappa. The location of the imaging system can have world-space coordinates such as latitude, longitude, and altitude, or UTM northing, easting, and altitude. Altitude can be altitude above mean sea level, altitude above ground level, or altitude above home point, where home point is the location where the UAV launched or will land. Altitude above ground level can be measured by an altitude sensor such as a laser altimeter. Altitude above ground level can be calculated by using altitude above sea level as determined by a navigation system and using a ground elevation lookup. Subtracting ground elevation from altitude above sea level results in altitude above ground level. A common simplification is to assume the ground is flat, meaning the ground elevation everywhere is the same as the ground elevation of the home point, which is also the altitude above mean sea level of the home point. Then, altitude above ground level can be approximated as altitude above home point. The velocity of the imaging system during image capture can be directions and magnitudes in the same coordinate system or a different coordinate system, such as UTM easting velocity, UTM northing velocity, and altitude velocity. The imaging system's pose can be the combination of the imaging system's external parameters and the imaging system's internal parameters. Given a transform, the pose contains all information necessary to transform a pixel-space coordinate into a world-space coordinate.

A photogrammetry process as used herein refers to a process or set of processes which relate to the production of 3-dimensional measurements from 2-dimensional images. The photogrammetry process may include image alignment processes and feature matching processes. The photogrammetry process may include the calculation of relative transforms between neighboring images. The photogrammetry process may include the triangulation of points identified in neighboring images. The photogrammetry process may include the creation of a point cloud, consisting of identified points across images. The photogrammetry process may include bundle adjustment, where a mathematical optimization results in the refinement of both the point cloud and the imaging system's poses. Optional outputs of a photogrammetry process can include a stitched mosaic or orthomosaic, a point cloud, transform parameters, and image poses. Photogrammetry processes are typically constructed of many steps, each of which can be skipped, run once, or run multiple times. Steps can be arranged in various orders. Several steps can be run, then new images included, then new steps run or previous steps repeated. After each step, intermediate results are written to a storage device to enable the photogrammetry process to be continued. At any step, the photogrammetry process can be constrained to prevent updates to certain values, such as the poses of some images or the point cloud. Examples of software including a photogrammetry process are Pix4D's Pix4Dmapper™ and Agisoft's Metashape™.

A spot spray prescription as used herein refers to a set of world-space shapes, which may include points, lines, or polygons. The spot spray prescription serves as a set of instructions to an implement or vehicle designed to precisely apply chemical or other treatments to specific areas. A spot spray prescription may contain additional information including species, size, application rate, chemical to apply, mixture of chemicals to apply, application distance, or other parameters of an application task. Other terms for prescriptions include recommendation, rec, script, RX, and Rx.

In agriculture research, it is common to perform plot trials. In a plot trial, different plots are established, and each plot may have a treatment. Often plots have different treatments, and often several plots have the same treatment. Example treatments include different seed varieties, different seed treatments (such as coatings or microbial technologies), different fertilizers, different fertilizer rates, different herbicides, different herbicide rates, different fungicides, different fungicide rates, different insecticides, different insecticide rates, different biological treatments, or different microbial treatments. Researchers make measurements from the ground to study the effect of different treatments. Making these measurements from a UAV results in more efficient measurement collection, and more objective measurement collection, eliminating observer bias. Plots can have many sizes. In some cases, plots are small, such as two crop rows wide and 17.5 ft. long, typically referred to as small plots. In some cases, plots are the width of a planter or sprayer, such as 8 crop rows wide and 200 ft long, typically referred to as strip trial plots. The plots can be any size. A plot measurement is used to identify per-plot characteristics in an agronomic experiment. The plot measurement requires a plot location file consisting of polygons covering the extent of each experimental plot in world-space as an input. Each plot may receive a different experimental treatment. In the small plot measurement process, features may be identified in pixel space. The pixel-space features are transformed into world space as described herein, and the features are assigned to a plot if their world-space locations are within a small-plot polygon. Once features are identified within polygons, summary statistics describing characteristics of the features within may be added to the small-plot polygons. These summaries may include count, percent of a plot occupied by crop or weed, spatial distribution, a summary statistic on values associated with each feature, or the presence or absence of features of interest.

It is difficult to achieve perfect (0%) overlap between images. As a result, usually there will be some overlap between images, meaning two or more images may capture the same item of interest as explained above. The methods described herein provide approximations of world-space locations of items of interest, and are subject to some error. As a result, if the same item of interest is detected in two images, the world-space locations computed from the two images may be slightly different. When processing many images, it is possible to have a list of locations of items of interest on which the same item of interest is listed multiple times. In some cases, this is not an issue. For example, in producing a weed spot spray prescription, it is most important to identify the approximate area of all weeds. It is likely a buffer will be applied to the locations of weeds which would encompass the slightly different world-space locations generated from each image. Accordingly, in this situation, there is no need to determine that two items of interest are actually the same item of interest. In the case of counting plants for plot measurements, it may be important to ensure each plant is only counted once. In this situation, two images capturing the same plant would produce two items of interest with slightly different locations. It is not desirable to count the same plant twice.

Therefore, in some situations, a method (referred to as a deduplication method) for determining that the two items of interest identified from the two images are actually a single item of interest is required. One such deduplication method would be to consider the distance between approximated locations of nearby items of interest, along with similarities between the items of interest, to determine that they are the same. For example, if two items of interest are within some distance of each other and have a similar size, they would be identified as a single item of interest, and could be replaced with a new item of interest with coordinates determined by averaging the coordinates of the duplicate items of interest. In another deduplication method, each region of world-space is assigned to a single image, and only items of interest identified in the image assigned to that region will be included in the list of items of interest. The determination of regions and assignment to individual images may be performed by considering the nearest camera location, or the nearest projected camera center. In plot measurements, each plot can be assigned to a single image, such as the image with the best view of the plot, or captured from closest to the plot center, or having a projected camera center closest to the plot center.

NSGR Example

In NSGR, one set of images is used. The images could be the narrow field of view drone images or the wide field of view drone images. Therefore, NSGR can be practiced with a single camera on the UAV, such as either the narrow field of view camera on the UAV or the wide field of view camera on the UAV. Alternatively, both cameras can be provided on the UAV but either the wide field of view camera or the narrow field of view camera is inactive or the wide field of view drone images or the narrow field of view images are ignored. In this example, the x, y pixel space locations of the items of interest and the camera pose (internal and/or external parameters) associated with each drone image are used to determine the corresponding world-space location 72. Further information on transforming the x, y pixel space locations to world-space locations in NSGR is provided below in the Examples below.

AGR Example

In AGR, the wide field of view drone images are stitched together to produce a mosaic image, such as with a photogrammetry process. Stitching images to form a mosaic image is described in U.S. Pat. No. 10,402,942 the entire contents of which are incorporated herein by reference. The narrow field of view drone images are then aligned to the mosaic image. Aligning narrow field of view images to a stitched mosaic of wide field of view images can be done with conventional software, such as ESRI's ArcGIS Pro™. ArcGIS Pro™ offers an "Auto Georeference" function which accepts as input a first mosaic image, a second image which may or may not be a mosaic, and a selected transform, then determines the transform parameters that align the second image to the first mosaic image. ArcGIS Pro™ can optionally perform the transform on the second image, generating a transformed second image. Transforming the second image is not required, only the determination of the transform parameters. Following determination of the transform parameters, a transform and transform parameters can then be used to transform locations of items of interest in pixel-space to world-space. So items of interest located at x, y pixel space locations in the narrow field of view drone images can be transformed to world-space locations without the processing having to happen on the transformed second image.

OC-PCPG Example

In OC-PCPG, the imaging system includes both the wide field of view camera and the narrow field of camera, and the wide field of view drone images and the narrow field of view drone images are captured at the same time. "one camera" in OC-PCPG refers to the fact that only one camera is used in the photogrammetry process, but two cameras are used in the overall process. In OC-PCPG, a photogrammetry process is performed using the wide field of view drone images to generate poses of the wide field of view camera for each image. Since the wide field of view drone images and the narrow field of view drone images are captured at the same time, the computed poses of the wide field of view camera can be used to determine poses of the narrow field of view drone images in a pose transfer process. For example, in one example of a pose transfer process, the pose of each wide field of view image is taken as the pose of each corresponding narrow field of view image. In another embodiment, a calibration offset is applied to the poses of the wide field of view images to generate poses of the narrow field of view images.

An image capture device calibration offset is a set of parameters which describes the offset between a narrow image and a wide image. The offset can include translation and rotation. The offset between wide images and narrow images is constant for a given imaging system, unless a component of the imaging system, such as the lens or the focal plane array, is moved. The offset can be different for different copies of the same imaging system as a result of manufacturing variability. The offset can be determined at the time of manufacturing and recorded for later use, or determined in a calibration procedure at any time. The offset can be applied to the wide image's pose to determine the narrow image's pose. Following the OC-PCPG process, the transform used in NSGR can then be used to determine the world-space locations. Further information on transforming the x, y pixel space locations to world-space locations in OC-PCPG is provided below in the Examples.

TC-PCPG Example

In TC-PCPG, the imaging system includes both the wide field of view camera and the narrow field of camera, but the wide field of view drone images and the narrow field of view drone images are captured with a small time delay between the images of the different cameras. The TC-PCPG process performs some steps of a photogrammetry process using only the wide field of view images, performs some steps of the photogrammetry process using the wide field of view images and the narrow field of view images, and generates poses of the narrow field of view images. In one embodiment of the TC-PCPG process, a photogrammetry process is performed using the wide field of view drone images. A continuation of the photogrammetry process is performed using the intermediate results of the first photogrammetry process and using the narrow field of view images, and constraining the photogrammetry process to not update the poses of the wide field of view images. The photogrammetry process then determines the poses of the narrow field of view drone images. Following the TC-PCPG process, the poses can then be used to transform the pixel space locations of the items of interest in the narrow field of view drone images to the world-space locations. Further information on transforming the x, y pixel space locations to world-space locations in TC-PCPG is provided in the Examples below.

Transformation Examples

BACKGROUND

A transform is a mathematical process for transforming coordinates in one coordinate frame to corresponding coordinates in another coordinate frame. A transform can be used to transform pixel-space coordinates to world-space coordinates, a process which can include projection onto a surface, as in the case of projecting a ray defined by a pixel-space coordinate and a camera's pose onto the surface of the earth. A transform can transform pixel-space coordinates to different pixel-space coordinates, as in the case of aligning a first image to a second image, in the pixel-space coordinates of the second image. A transform can transform world-space coordinates to different world-space coordinates, as in the case of aligning a poorly georeferenced image to a well georeferenced image. Transform parameters used by the transforms described herein include image poses and image capture device offset(s).

Part of the transforms includes image alignment. Consider a situation where a first image and a second image contain some overlap, meaning they include some of the same scene, or content. Image alignment is a process of determining how to adjust a first image to align with a second image. A software process analyzes both images and determines how to transform the first image so that it is aligned with the second image. If the transform is applied, the first image appears to be on top of the second image. To determine how one image is transformed to align with another, the software process may use one or more of many different algorithms well known in the art, such as feature matching, corner detection, template matching, cross-correlation, normalized cross-correlation, or genetic algorithms. A feature matching example is detailed below. Note that the image alignment process determines a set of transform parameters that can be used to transform a first image to a new image aligned to the second image, but the image alignment process itself does not require that the first image actually be transformed. The simple determination of transform parameters is enough. There are many transforms for adjusting a first image to produce a transformed first image, including homography, linear, helmert, first order polynomial, second order polynomial, third order polynomial, affine, thin plate spline, and projective. These transforms are well known in the art. One example is QGIS software documentation: https://docs.qgis.org/3.4/en/docs/user manual/plugins/core plugins/plugins georeferencer html #available-transformation-algorithms). One detailed example of a transform and transform parameters is provided below.

Feature matching is a process of identifying the same feature of a scene, such as an agricultural field, in multiple images. Determining the pixel-space coordinates of a single feature in multiple images enables the photogrammetry process. Feature matching consists of identifying salient features within an image and identifying corresponding features by matching their descriptors. For example, in one method of feature matching, a descriptor represents the variations in brightness around a feature. Feature descriptors may be matched between images. Features may be matched across all images, to create a unique group of features which contain associated sensor poses for each observation of the feature. There are many well-known feature matching algorithms including Harris Corner Detection, Scale-Invariant Feature Transform (SIFT), Speeded-Up Robust Features (SURF), Features from Accelerated Segment Test (FAST), Binary Robust Independent Elementary Features (BRIEF), and Oriented FAST and Rotated BRIEF (ORB). An example of SIFT is described in U.S. Pat. No. 6,711,293 the entire contents of which are incorporated herein by reference.

The following is an example of a transform that transforms pixel-space coordinates to world-space coordinates. There are many transforms known in the art that could be used to transform pixel-space locations to world-space locations. Examples of transforms include, but are not limited to, projections, homographies, affinities, rotations, translations, shears, reflections, homotheties, and combinations of the aforementioned transformations. The following example is a combination of rotation and translation transforms.

The Internal Parameter Matrix:

Three parameters, the focal length f, and optical center cx, cy, sometimes known as the principal point, of the imaging system can form a matrix K such that:

$$K = \begin{pmatrix} f & 0 & cx \\ 0 & f & cy \\ 0 & 0 & 1 \end{pmatrix}$$

where f, cx, and cy are examples of internal parameters of the imaging system.

The Rotation Matrix:

The orientation of a camera on the UAV in Euler angles-roll, pitch, and yaw-is equivalently represented by the matrix R, the product of three matrices Ryaw, Rpitch, and Rroll such that:

$$R_{yaw} = \begin{pmatrix} \cos y & -\sin y & 0 \\ \sin y & \cos y & 0 \\ 0 & 0 & 1 \end{pmatrix}$$

$$R_{pitch} = \begin{pmatrix} \cos p & 0 & \sin p \\ 0 & 1 & 0 \\ -\sin p & 0 & \cos p \end{pmatrix}$$

$$R_{roll} = \begin{pmatrix} 1 & 0 & 0 \\ 0 & \cos r & -\sin r \\ 0 & \sin r & \cos r \end{pmatrix}$$

$$R = R_{yaw} * R_{pitch} * R_{roll}$$

where r, p, and y are the roll, pitch, and yaw in radians. r, p, and y are examples of external parameters of the imaging system.

The Camera Location Vector:

The location component of a camera pose is the offset from the camera position to the origin of the world-coordinate system in use. It is formed as:

$$L = \begin{pmatrix} wx \\ wy \\ wz \end{pmatrix}$$

The values of wx, wy and wz of L are real-world coordinates of the camera, such as North-East-Down-0 coordinates in a UTM datum, and wz is the altitude above ground level.

Non-Linear Distortions

The optical path of a camera may introduce radial distortion, seen as a barrel or pincushion effect on an image. Radial distortion may be measured from the manufacturer or calculated as part of the photogrammetry process. Corrections can be modeled by a set of coefficients, k1-3. The pixel locations of points of interest can be corrected for this radial distortion by:

$$px_{corrected} = px(1 + k_1 r^2 + k_2 r^4 + k_3 r^6)$$

$$py_{corrected} = py(1 + k_1 r^2 + k_2 r^4 + k_3 r^6)$$

where px and py are the coordinates of an item of interest in pixel-space, and r is the distance from the optical center of the image cx, cy to the pixel location of the feature of interest, in pixels. There are other possible distortions, such as tangential distortion.

Change of Coordinate Convention:

The pixel coordinates originate in the top left, following a right-back-down convention. The rotation matrix is defined with front (yaw)-right (pitch)-down (roll) convention. The following matrix F performs the conversion between the right-back-down frame and the front-right-down frame:

$$F = \begin{pmatrix} 0 & -1 & 0 \\ 1 & 0 & 0 \\ 0 & 0 & 1 \end{pmatrix}$$

The Bearing Vector and Plane Vector:

The computation of a bearing vector from pixel coordinate, given a rotation and translation matrix is given by:

$$b = R * F * K^{-1} * \begin{pmatrix} px_{corrected} \\ py_{corrected} \end{pmatrix}$$

To obtain the final location of a pixel coordinate, the bearing vector is intersected with a ground plane. Given a local coordinate system with an origin at the point directly below the camera center on the earth's surface, the plane is normal to a downward vector at the origin. The intersection of the plane and the bearing vector is the location of the point of interest.

Given the representation of the plane by its normal vector in homogenous coordinates, $$p = (0\ 0\ -1\ 0),$$

a unit-length bearing vector in homogenous coordinates b, and a camera's world location vector in homogenous coordinates L, the length s along the bearing vector to the plane is calculated as:

$$s = -\frac{(p'L)}{(p'b)}$$

The Intersection Point

The location of the intersection point I is calculated as:

$$I = sb + L$$

This intersection point is the world-coordinate location of the feature of interest.

In the example above the intersection is computed by intersecting the bearing vector with a plane, representing a simplified assumption of flat ground.

In another embodiment, the intersection point can be determined by intersecting a bearing vector with a 3D model of the ground surface.

AGR Example—composing homographies

Georeferenced mosaics contain geolocation information in the form of a geotransform. The geotransform is an affine transformation, a subclass of homographies.

The mosaic's affine geotransform is a 2×3 matrix, named here as $A_{mosaic-to-world}$ which can be promoted to a homography by $$H_{mosaic-to-world} = \begin{pmatrix} A_{mosaic-to-world} \\ 0\ 0\ 1 \end{pmatrix}$$

The relative transform from an image to a mosaic computed by the image alignment process may be composed with the mosaic's geotransform to calculate a transformation from image pixel-space to world-space by the following:

$$H_{image-to-world} = H_{mosaic-to-world} * H_{image-to-mosaic}$$

The world space location w of a feature of interest can then be calculated from its pixel space location by the following:

$$\begin{pmatrix} x' \\ y' \\ w \end{pmatrix} = H_{image-to-world} * \begin{pmatrix} x \\ y \\ 1 \end{pmatrix}$$

$$w = \begin{pmatrix} x'/w \\ y'/w \end{pmatrix}$$

In the examples above, the x, y world-space locations are determined. If altitude (Zworld) needs to be determined, the altitude can be determined by using the x, y world space coordinates to look up the altitude at those coordinates.

Once the world-space locations of the items of interest are determined, the world-space locations can be saved in suitable data storage. In addition, the items of interest can be used to generate information about the agricultural field. For example, if the items of interest are weeds, a spot spray weed prescription described above can be generated. For example, the world-space locations of the weeds can be saved in a file that is read by a herbicide sprayer to turn herbicide spray nozzles on and off over the indicated world-space locations in the field. In another embodiment, a small plot plant count can be generated. For example, a small plot is a region of the agricultural field that is smaller in size than the field, and may be a rectangle or have any other shape. When the items of interest are crop plants, such as corn, a count of the number of plants in the small plot can be generated. One can count discrete items of interest (for example, a specific count of the number of plants in the entire field or in a small plot), or determine a measurement relating to an area (for example, determine a percentage of an area covered by plants, a size of an area covered by water, and the like).

Figure 5:
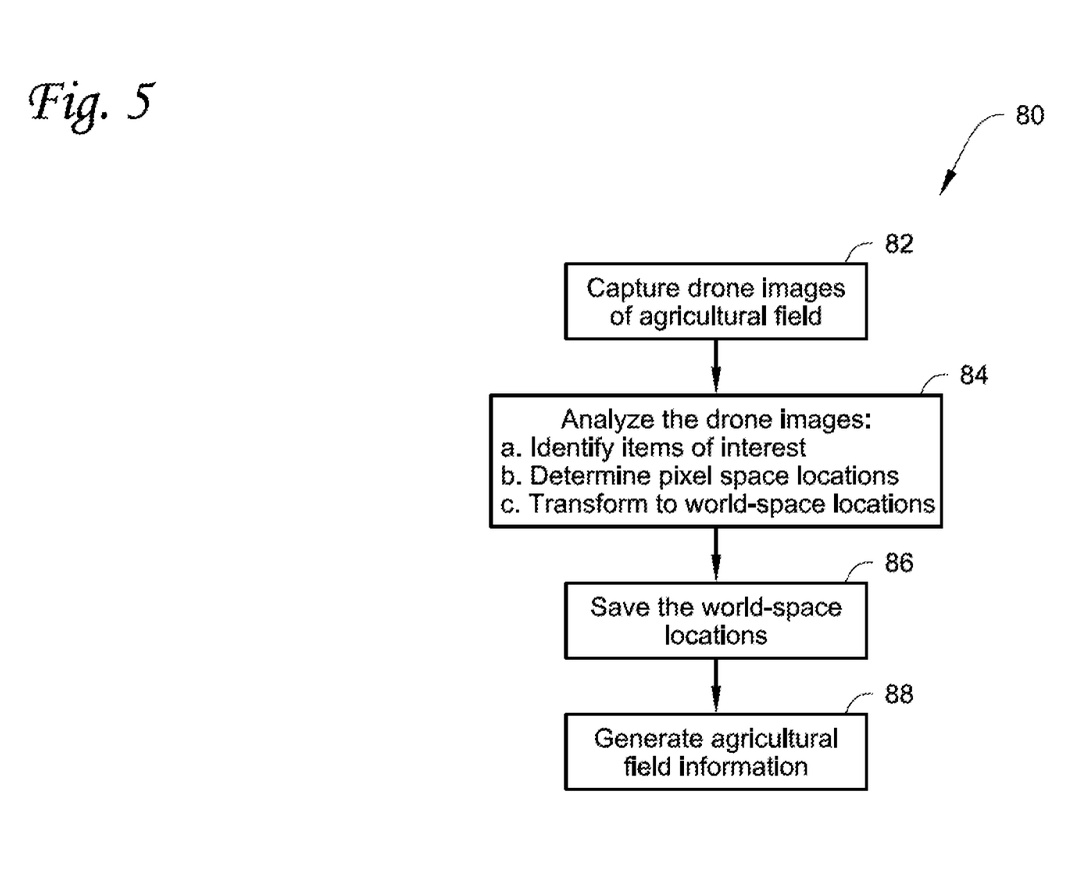
FIG. 5 schematically depicts a precision agriculture method described herein.

FIG. 5 illustrates an example of a precision agriculture method 80. At 82, drone images of the field are captured using the imaging system on the UAV. At 84, the drone images are then analyzed. The analysis in 84 includes identifying items of interest in the drone images, determining the pixel space locations of the items of interest (and optionally determining the camera pose), and then transforming the pixel space locations to world-space locations. The world-space locations are then saved at 86, and the world-space locations can be used to generate information on the agricultural field at 88, for example generate the spot spray weed prescription and/or generate the plant count. The information may also be optionally used to generate a plan to take action on the information. For example, a map for rock removal or a spot spray prescription for herbicide application can be generated. In the case of small plots, the action may be further analysis of the information. In an embodiment, the capture of the drone images 82 can be performed by one entity that then provides the images to an entity that analyzes the drone images and generates the field information.

In an embodiment, the analysis of the drone images obtained in step 82 is performed in real-time on the UAV using the computer processor(s) located on the UAV, or the analysis of the drone images is performed in real-time remote from the UAV, for example by the processing station 20 (FIGS. 1 and 3) using the computer processor(s) thereof.

In another embodiment, the drone images obtained in step 82 are post-analyzed or post-processed some length of time after the drone images are captured. For example, the post-processing of the drone images can be performed on the UAV, for example once the UAV lands (or even while the UAV is in flight), or the post-processing can be performed remote from the UAV, for example by the processing station 20 (FIGS. 1 and 3).

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A precision agriculture method, comprising:
receiving a plurality of drone images of an agricultural field that are captured by an imaging system of an unmanned aerial vehicle (UAV), the imaging system includes at least one camera that includes poses comprising internal parameters and external parameters;
analyzing each one of the drone images using at least one computer processor, wherein the analyzing includes for each one of the drone images:
identifying at least one weed in the drone image and determining a pixel-space location of the at least one weed in the drone image; and
applying a transform to the pixel-space location to determine the world-space location of the at least one weed in the drone image using transform parameters that are determined by using the poses, including the internal parameters and the external parameters, of the at least one camera, wherein the internal parameters include one or more of: a pixel-space location of an optical center of the camera; a physical dimension of the camera; a pixel-space dimension of the camera; a focal length of a lens of the camera; and coefficients of a distortion model which describe distortion of the lens;
and saving the world-space locations for all of the weeds from all of the drone images in data storage; and
producing a spot spray weed prescription for the agricultural field using the world-space locations of the weeds.

2. The precision agriculture method of claim 1, wherein the drone images include a first plurality of drone images having a first field of view and a second plurality of drone images having a second field of view that is less than the first field of view, and wherein the transform parameters are determined by:
receiving external parameters of the first plurality of drone images; and
determining external parameters of the second plurality of drone images using the external parameters of the first plurality of drone images.

3. The precision agriculture method of claim 2, wherein the external parameters of the first plurality of drone images are determined by performing a one-camera photogrammetry-calibrated pose generation process.

4. The precision agriculture method of claim 1, wherein the drone images include a first plurality of drone images having a first field of view and a second plurality of drone images having a second field of view that is less than the first field of view, and wherein the transform parameters are determined by:
performing a two-camera photogrammetry-calibrated pose generation process.

5. The precision agriculture method of claim 1, wherein the UAV includes a navigation system, and the external parameters of the at least camera are determined using the navigation system.

6. The precision agriculture method of claim 1, wherein the analyzing is performed in real-time on the UAV and the at least one computer processor is located on the UAV, or the analyzing is performed in real-time remote from the UAV and the at least one computer processor is located remote from the UAV.

7. The precision agriculture method of claim 1, wherein the analyzing is post-analyzing performed on the UAV and the at least one computer processor is located on the UAV, or the analyzing is post-analyzing performed remote from the UAV and the at least one computer processor is located remote from the UAV.

8. A precision agriculture method, comprising:
using a camera on an unmanned aerial vehicle (UAV) to capture a plurality of drone images of an agricultural field, the camera includes poses comprising internal parameters and external parameters, the UAV including a navigation system, and the external parameters of the camera are determined using the navigation system;
analyzing the plurality of drone images, without generating a mosaic, using at least one computer processor, wherein the analyzing includes:
identifying individual weeds in the plurality of drone images and determining pixel-space locations of the individual weeds in the plurality of drone images; and
applying a transform to the pixel-space locations to determine the world-space locations of the individual weeds in the plurality of drone images using transform parameters that are determined by using the poses, including the internal parameters and the external parameters, of the camera, wherein the internal parameters includes one or more of: a pixel-space location of an optical center of the camera; a physical dimension of the camera; a pixel-space dimension of the camera; a focal length of a lens of the camera; and coefficients of a distortion model which describe distortion of the lens; and
producing a spot spray weed prescription for the agricultural field using the world-space locations of the individual weeds.

9. The precision agriculture method of claim 8, further comprising producing a count of the weeds.

10. The precision agriculture method of claim 8, wherein the plurality of drone images include a first plurality of drone images having a first field of view and a second plurality of drone images having a second field of view that is less than the first field of view, and wherein the transform parameters are determined by:
receiving external parameters of the first plurality of drone images; and
determining external parameters of the second plurality of drone images using the external parameters of the first plurality of drone images.

11. The precision agriculture method of claim 10, wherein the external parameters of the first plurality of drone images are determined by
performing a one-camera photogrammetry-calibrated pose generation process.

12. The precision agriculture method of claim 8, wherein the plurality of drone images include a first plurality of drone images having a first field of view and a second plurality of drone images having a second field of view that is less than the first field of view, and wherein the transform parameters are determined by:
performing a two-camera photogrammetry-calibrated pose generation process.

13. The precision agriculture method of claim 8, wherein the navigation system on the UAV includes an inertial measurement unit and a global navigation satellite system sensor; and comprising determining the external parameters of the camera from the inertial measurement unit and the global navigation satellite system sensor.

14. The precision agriculture method of claim 13, further comprising a navigation filter that receives data from the inertial measurement unit and from the global navigation satellite system sensor to determine the external parameters.

15. The precision agriculture method of claim 8, wherein the external parameters comprise camera location and camera orientation.

16. The precision agriculture method of claim 15, wherein the camera orientation comprises yaw, pitch, and roll; or the camera orientation comprises omega, phi, and kappa.

17. The precision agriculture method of claim 8, wherein the pixel space location of each of the individual weeds is identified as a point representing the center of the individual weed, a bounding box containing the individual weed, or an outline of the individual weed.

18. The precision agriculture method of claim 8, wherein the world-space locations are saved in a file that can be read by a herbicide sprayer to turn herbicide spray nozzles on and off over the world-space locations in the agricultural field.

19. The precision agriculture method of claim 8, wherein the pixel-space location of the at least one weed is a point representing the center of the weed, a bounding box containing the weed, or an outline of the weed; the world-space location of the at least one weed is a point representing the center of the weed, a bounding box containing the weed, or an outline of the weed; and the spot spray weed prescription is a file including the world-space locations of the weeds that can be read by a herbicide sprayer to turn herbicide spray nozzles on and off over the indicated world-space locations in the field.

20. A precision agriculture system, comprising:
an unmanned aerial vehicle (UAV) with an imaging system that captures a plurality of drone images of an agricultural field, the imaging system includes at least one camera that includes poses comprising internal parameters and external parameters, wherein the internal parameters includes one or more of: a pixel-space location of an optical center of the camera; a physical dimension of the camera; a pixel-space dimension of the camera; a focal length of a lens of the camera; and coefficients of a distortion model which describe distortion of the lens; and the imaging system further includes a navigation system that determines the external parameters of the at least one camera;
at least one computer processor;
a storage device comprising instructions, which when executed by the at least one computer processor, configure the at least one computer processor to:
analyze each one of the drone images, including for each one of the drone images:
identify at least one weed in the drone image and determine a pixel-space location of the at least one weed in the drone image;
apply a transform to the pixel-space location to determine the world-space location of the at least one weed in the drone image using transform parameters that are determined by using the poses, including the internal parameters and the external parameters, of the at least one camera; and save the world-space locations for all of the weeds from all of the drone images in data storage.

21. The precision agriculture system of claim 20, further comprising a first camera that captures a first plurality of drone images having a first field of view and the at least one camera that captures a second plurality of drone images having a second field of view that is less than the first field of view.

22. The precision agriculture system of claim 21, wherein the transform parameters are determined by:

receiving the external parameters of the first plurality of drone images; and determining external parameters of the second plurality of drone images using the external parameters of the first plurality of drone images.

23. The precision agriculture system of claim 22, wherein the external parameters of the first plurality of drone images are determined by performing a one-camera photogrammetry-calibrated pose generation process.

24. The precision agriculture system of claim 21, wherein the transform parameters are determined by:

performing a two-camera photogrammetry-calibrated pose generation process.

* * * * *